US009994231B2

(12) United States Patent
Di Censo et al.

(10) Patent No.: US 9,994,231 B2
(45) Date of Patent: Jun. 12, 2018

(54) FORCE MEASURING STEERING WHEEL

(71) Applicant: HARMAN INTERNATIONAL INDUSTRIES, INC., Stamford, CT (US)

(72) Inventors: Davide Di Censo, Oakland, CA (US); Stefan Marti, Oakland, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 56 days.

(21) Appl. No.: 14/806,623

(22) Filed: Jul. 22, 2015

(65) Prior Publication Data

US 2016/0185356 A1   Jun. 30, 2016

Related U.S. Application Data

(60) Provisional application No. 62/098,964, filed on Dec. 31, 2014.

(51) Int. Cl.
| | | |
|---|---|---|
| *B60W 50/00* | (2006.01) | |
| *B62D 1/04* | (2006.01) | |
| *B62D 1/06* | (2006.01) | |
| *B60K 35/00* | (2006.01) | |

(Continued)

(52) U.S. Cl.
CPC ......... *B60W 50/0098* (2013.01); *B60K 35/00* (2013.01); *B60K 37/00* (2013.01); *B62D 1/046* (2013.01); *B62D 1/06* (2013.01); *G01L 5/221* (2013.01); *B60K 2350/1024* (2013.01); *B60K 2350/928* (2013.01); *B60W 2422/50* (2013.01)

(58) Field of Classification Search
CPC ..... B60K 2350/1024; B60K 2350/928; B60W 2422/50; B62D 1/046; G01L 5/221
USPC ......................................................... 701/36
See application file for complete search history.

(56) References Cited

U.S. PATENT DOCUMENTS

| 6,868,934 B2 | 3/2005 | Dirrig |
| 2002/0104705 A1 | 8/2002 | Kuhn, Jr. |

(Continued)

FOREIGN PATENT DOCUMENTS

| DE | 10318713 A1 | 12/2003 |
| DE | 102006023287 A1 | 12/2007 |

(Continued)

OTHER PUBLICATIONS

European Search Report Application No. 15199976.0, dated Jun. 1, 2016, 10 pages.

(Continued)

*Primary Examiner* — Harry Y Oh
(74) *Attorney, Agent, or Firm* — Artegis Law Group, LLP

(57) ABSTRACT

A steering wheel within a vehicle includes a plurality of sensors that measure forces applied to the steering wheel. An application executing on a computing device records sensor data from the sensors, and then interprets that data as specific force inputs. The application then translates those force inputs into specific commands that can be executed by subsystems within the vehicle. At least one advantage of the techniques set forth herein is that the driver of a vehicle that implements the force control system need not remove either hand from the steering wheel in order to adjust the operation of subsystems within the vehicle, thereby improving driver safety.

18 Claims, 17 Drawing Sheets

(51) Int. Cl.
  *B60K 37/00* (2006.01)
  *G01L 5/22* (2006.01)

(56) References Cited

U.S. PATENT DOCUMENTS

| | | | |
|---|---|---|---|
| 2003/0111278 A1* | 6/2003 | Hauer | B62D 1/06 180/6.28 |
| 2005/0037884 A1* | 2/2005 | Hermann | B62D 5/008 475/18 |
| 2006/0047386 A1* | 3/2006 | Kanevsky | B60K 35/00 701/36 |
| 2007/0062753 A1* | 3/2007 | Yoshida | B60K 37/06 180/333 |
| 2007/0100523 A1* | 5/2007 | Trachte | B60K 35/00 701/41 |
| 2008/0061954 A1 | 3/2008 | Kulas | |
| 2009/0102788 A1* | 4/2009 | Nishida | G06F 3/014 345/158 |
| 2011/0094820 A1* | 4/2011 | Bootz | B60R 25/021 180/422 |
| 2012/0179328 A1* | 7/2012 | Goldman-Shenhar | B62D 1/046 701/36 |
| 2012/0232751 A1* | 9/2012 | Guspan | B62D 1/046 701/36 |
| 2014/0151356 A1 | 6/2014 | Maguire et al. | |
| 2014/0303848 A1* | 10/2014 | Bean | B62D 5/0472 701/41 |
| 2014/0360803 A1* | 12/2014 | Hori | B62D 5/0484 180/446 |
| 2015/0307022 A1* | 10/2015 | Nelson | B62D 1/046 701/36 |
| 2016/0167707 A1* | 6/2016 | Lee | B62D 15/025 701/41 |
| 2016/0221605 A1* | 8/2016 | Pregniard | B62D 15/021 |
| 2017/0023445 A1* | 1/2017 | Bourdrez | B62D 5/0463 |

FOREIGN PATENT DOCUMENTS

| | | |
|---|---|---|
| DE | 102007024141 A1 | 11/2008 |
| EP | 1764264 A2 | 3/2007 |
| WO | 2011/075390 A1 | 6/2011 |
| WO | 2013176944 A2 | 11/2013 |

OTHER PUBLICATIONS

Fox, "Cockpit Control Forces, or How Robust Do Driver Controls Really Need to Be?", Jul. 2010, pp. 1-6.
Baronti, "Distributed sensor for steering wheel rip force measurement in driver fatigue detection" 978-3-9810801-5-5/DATE09 © 2009 EDAA.
Park, "Plastic optical fiber sensor for measuring driver-gripping force", Optical Engineering, Feb. 2011/vol. 50(2), 3 Pages.

* cited by examiner

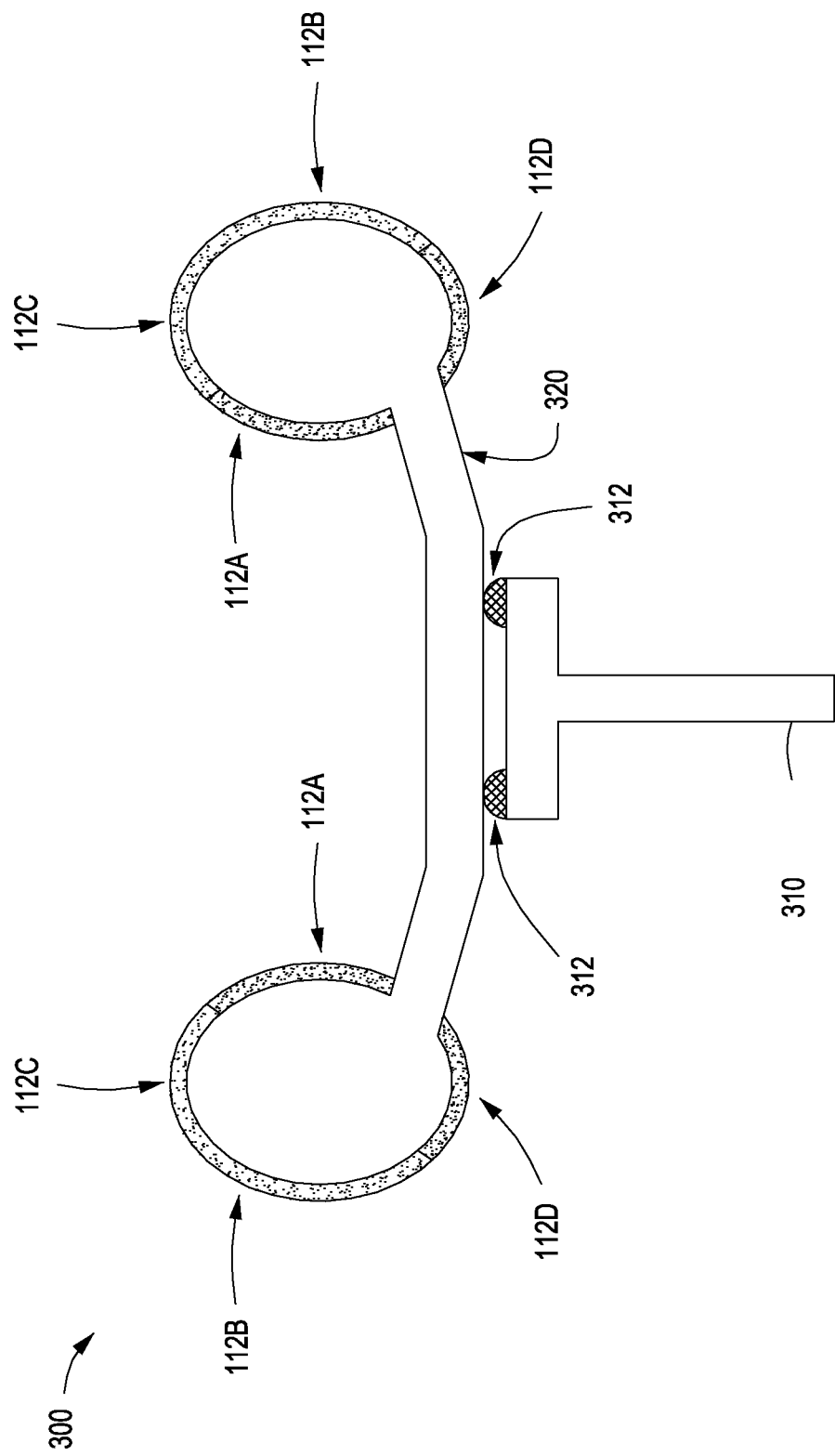

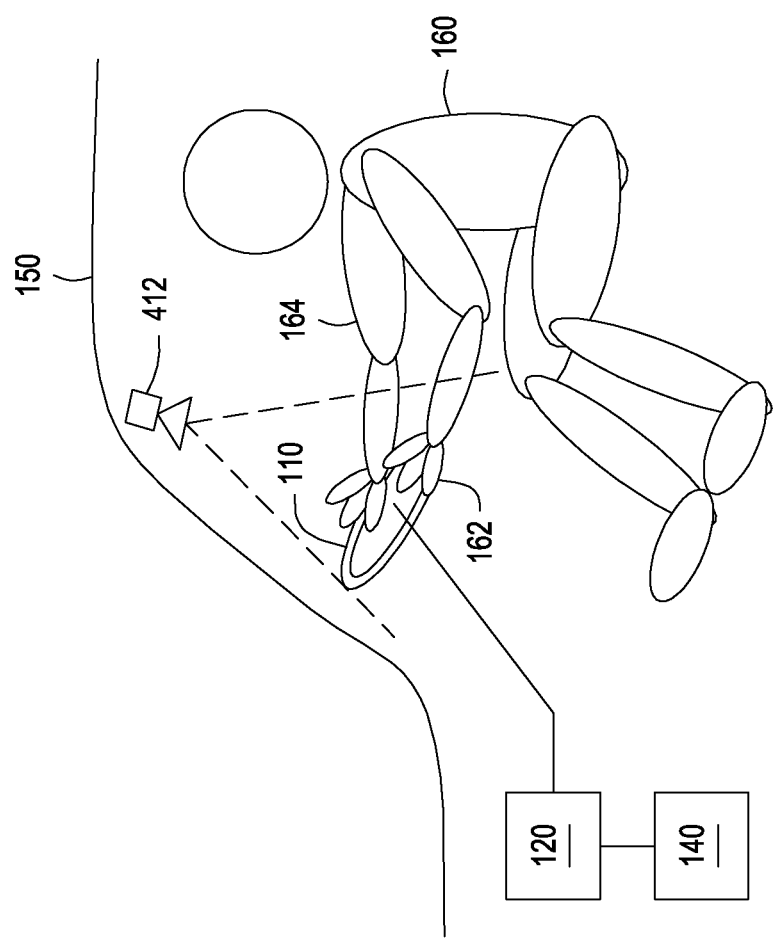

FORCE MEASURING STEERING WHEEL

CROSS-REFERENCE TO RELATED APPLICATIONS

This application claims the benefit of U.S. provisional patent application titled "Force Measuring Steering Wheel," filed on Dec. 31, 2014 and having Ser. No. 62/098,964. The subject matter of this related application is hereby incorporated herein by reference.

BACKGROUND

Field of the Various Embodiments

The various embodiments relate generally to human-vehicle interfaces and, more specifically, to a force measuring steering wheel.

Description of the Related Art

Modern vehicles typically include a variety of subsystems, such as a multimedia subsystem, climate control subsystem, power windows/power locks subsystem, and other similar subsystems. In addition, modern vehicles also generally include several different control panels for controlling those various subsystems. For example, the dashboard of the vehicle could include a multimedia panel and a climate control panel, while the door of the vehicle could include a power windows/power locks panel.

One problem with the configuration of the different panels described above is that the driver of the vehicle is required to remove at least one hand from the steering wheel in order to manipulate the control panels and control the corresponding subsystems. For example, the driver must remove one of his/her hands from the steering wheel in order to adjust the temperature, fan speed, air conditioner (A/C), and other items on the climate control panel. Another danger posed by this type of arrangement is that the driver is forced to divert focus away from the act of driving in order to interact with the different vehicle subsystems. Such diversions reduce the ability of the driver to control the vehicle, which compromises the safety of both the driver and the other occupants of the vehicle.

As the foregoing illustrates, techniques for controlling subsystems within a vehicle that do not require drivers to remove their hands from the steering wheel would be useful.

SUMMARY

One or more embodiments set forth include a non-transitory computer-readable medium storing program instructions that, when executed by a processor, cause the processor to control the operation of a plurality of subsystems included within a vehicle, by performing the steps of acquiring data that reflects a force imparted into a steering wheel, processing the data to identify a first force input included in a plurality of force inputs, converting the first force input into a first command, and causing a first subsystem included in the plurality of subsystems to execute the first command.

At least one advantage of the techniques set forth herein is that the driver of the vehicle need not remove either hand from the steering wheel in order to adjust the operation of subsystems within the vehicle, thereby improving driver safety. In addition, the driver can interact with those subsystems without averting visual focus, further improving driver safety. With these techniques, vehicle accidents due to driver distraction may be reduced.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

FIG. 3 illustrates a steering assembly that can be implemented with the steering wheel of FIGS. 1A-1B, according to various embodiments;

FIG. 4 illustrates an exemplary configuration of an optical sensor for detecting forces imparted by the driver of a vehicle, according to various embodiments;

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

Figure 1A:
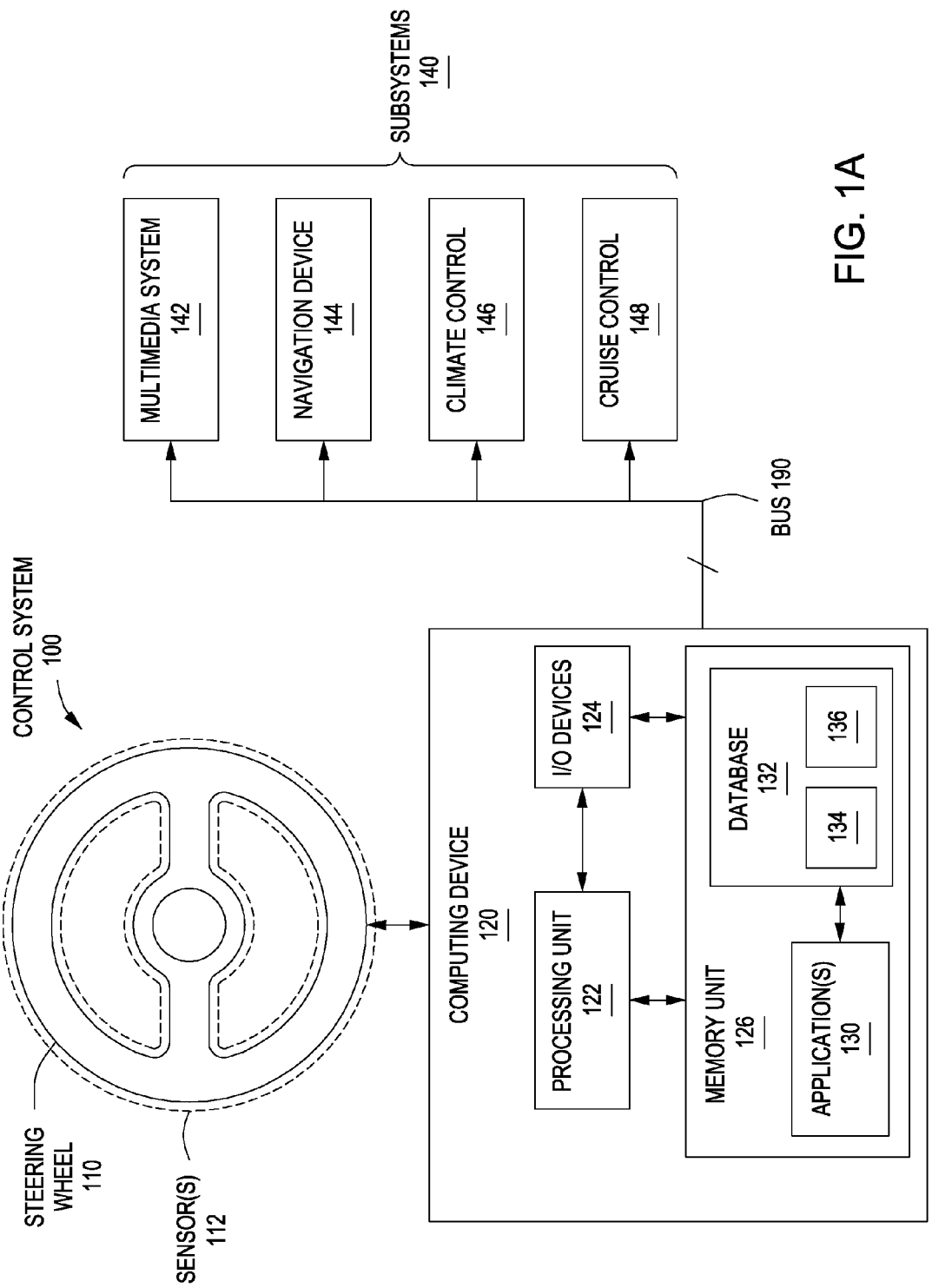
FIGS. 1A-1B illustrate a force control system configured to implement one or more aspects of the various embodiments.
Figure 1B:
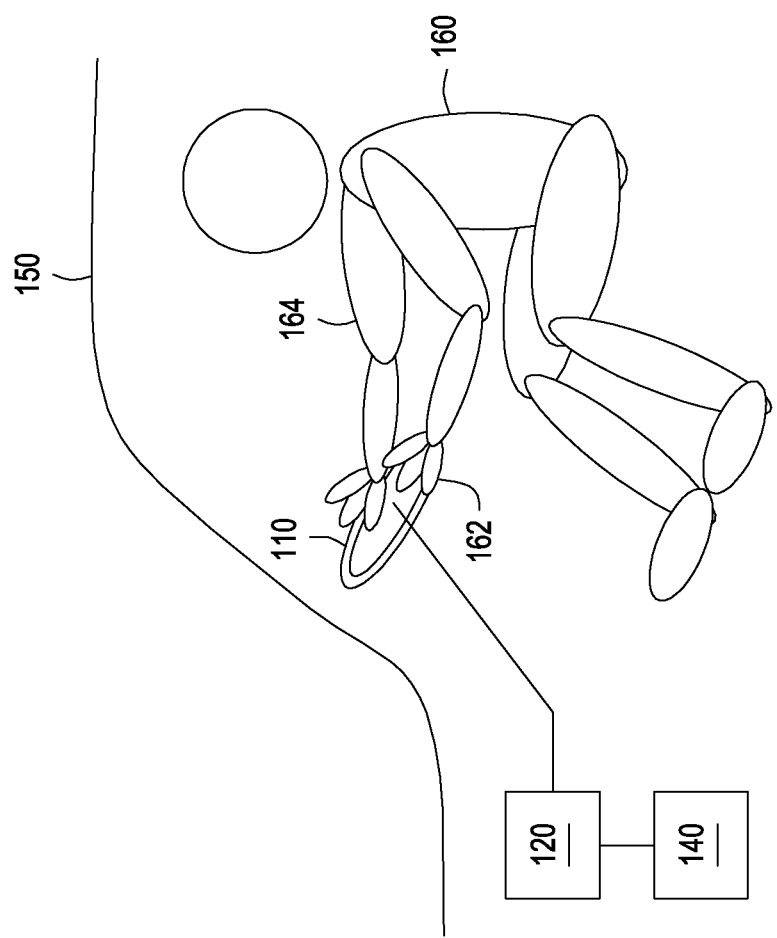

FIG. 1A illustrates a force control system configured to implement one or more aspects of the various embodiments. As shown, control system 100 includes a steering wheel 110 coupled to a computing device 120 that, in turn, is coupled to subsystems 140. Subsystems 140 include multimedia system 142, a navigation device 144, climate control 146, and cruise control 148. The particular subsystems shown are provided for exemplary purposes only, and not meant to limit the scope of the various embodiments. FIG. 1B illustrates an exemplary configuration of control system 100 within an exemplary vehicle.

Referring now to FIG. 1B, as shown, vehicle 150 includes steering wheel 110, computing device 120, and subsystems 140. As also shown, a driver 160 resides within vehicle 150. Left hand 162 of driver 160 is positioned on steering wheel 110. Right hand 164 of driver 160 is also positioned on steering wheel 110.

Referring generally to FIGS. 1A-1B, steering wheel 110 may be manipulated, in a conventional fashion, to control the direction of vehicle 150. Steering wheel 110 may also receive forces imparted by a driver. Control system 100 is configured to measure those forces and then perform a variety of different actions in response, including issuing commands to subsystems 140, as described in greater detail below.

Steering wheel 110 includes one or more sensors 112 that are disposed on and/or in the steering wheel 110 and/or a steering wheel column (not shown). Sensor(s) 112 may implement a wide variety of techniques for detecting forces imparted by driver 160. The imparted forces could include, for example, and without limitation, pressure forces, torque forces, shearing forces, poloidal and/or toroidal-oriented forces, and so forth. Steering wheel 110 may include any technically feasible kind of sensor capable of measuring any of the aforementioned forces. For example, and without limitation, steering wheel 110 could include pressure sensing, pneumatic sensing, strain gauge load cells, piezoelectric crystals, resistive sensing, capacitive sensing, visual sensing, thermal sensing, ultrasonic sensing, infrared sensing, laser-based sensing, radar-based sensing, time-of-flight sensing and structured light-based sensors, optical sensing of surface elements to determine shearing forces, micro-optical resonators, polymer-based shear force sensors, polymer sheets carpeted with nanohairs, piezoresistive shear sensors, and so forth.

In one embodiment, steering wheel 110 is configured to deform in response to imparted forces. That deformation may occur at a microscopic structural level within steering wheel 110, and therefore may not be noticeable to driver 160. Alternatively, the deformation of steering wheel 110 could occur at a macroscopic level that may, in fact, be noticeable to driver 160. In either case, sensors 112 are configured to detect and measure that deformation, and then quantify the imparted forces based on those measurements.

Sensor(s) 112 may be coupled to, or included within, steering wheel 110 according to a wide variety of different positions and/or orientations. Generally, sensor(s) 112 are located to allow driver 160 to input forces and/or pressures without removing either hand from steering wheel 110, as described in greater detail herein. For example, and without limitation, one or more sensors 112 may be located proximate to common hand positions assumed by driver 160 when grasping the steering wheel 110, and/or sensors 112 may be disposed along the circumference of the steering wheel 110 to allow the user to interact with the sensor(s) 112 regardless of the orientation (e.g., rotation) of the steering wheel 110.

Driver 160 imparts forces and/or pressures (e.g., shear forces and/or grasping pressure) to sensor(s) 112 in order to control the operation of multimedia system 142, navigation device 144, climate control 146 cruise control 148, and potentially other subsystems (not shown) beyond subsystems 140. Other subsystems could include, for example, acceleration, braking, a power window subsystem, a power locks subsystem, headlight controls, windshield wiper controls, traction or anti-slip settings, four-wheel drive controls, seat adjustment systems, interior lighting, a powered side and rear view mirror system, and so forth, without limitation.

Computing device 120 includes a processing unit 122, input/output (I/O) devices 124, and a memory unit 126. In various embodiments, computing device 120 may be a mobile computer, a system-on-a-chip (SoC), infotainment system, navigation system, mobile device, mobile phone, personal digital assistant, or any other device suitable for practicing one or more embodiments of the disclosure. As shown, computing device 120 is configured to receive input from sensor(s) 112. Computing device 120 may also be coupled to one or more output devices associated with the control system 100 that include one or more devices, such as haptic devices and/or speakers configured to generate feedback for driver 160. Generally, computing device 120 is configured to coordinate the overall operation of the control system 100. Any technically feasible system configured to implement the functionality of the control system 100 falls within the scope of the present disclosure.

Processing unit 122 may be any technically feasible unit configured to process data, including, for example, a central processing unit (CPU) or application-specific integrated circuit (ASIC), without limitation. I/O devices 124 include devices configured to receive input (such as, e.g., a set of buttons, without limitation) devices configured to deliver output (such as, e.g., a display screen, without limitation), as well as devices capable of both receiving input and delivering output (such as, e.g., a universal serial bus (USB) port, without limitation). In some embodiments, I/O devices 124 include one or more devices that implement sensor(s) 112, such as pressure sensors, force sensors, touch sensors, cameras, depth sensors, infrared sensors, time-to-flight sensors, ultrasound sensors, and the like. Accordingly, in some embodiments, I/O devices 124 measure various types of user input, such as forces, pressures, capacitances, button presses, hand positions, input directions, gestures, etc. associated with input received via steering wheel 110.

Memory unit 126 may be any technically feasible unit configured to store data and program code, including, for example, a random access memory (RAM) module or a hard disk, without limitation. Memory unit 126 includes one or more software applications 130 and a database 132. Software application(s) 130 within memory unit 126 may be executed by processing unit 122 to implement the overall functionality of computing device 120, and, thus, to coordinate the operation of the force measuring steering wheel as a whole. Database 132 includes interaction mapping 134 and command mapping 136. Interaction mapping 134 provides a mapping between force measurements recorded by sensors 112, and specific force inputs, as described in greater detail below. Command mapping 136 provides a mapping between force inputs and specific commands that may be executed by subsystems 140, as also described in greater detail below.

In operation, driver 160 exerts physical force on steering wheel 110 in order to issue commands to subsystems 140. Sensors 112 measure the physical force and output sensor data to computing device that reflects the magnitude, direction, position, and other attributes associated with that force. Application 130 then processes the sensor data, using interaction mapping 134, to map the measured force to a specific force input. Interaction mapping 134 could include, for example, and without limitation, an artificial neural network (ANN) configured to process sensor data and output a selection of a force input. The force input could be, for example, and without limitation, a two-handed torque input, a one-handed pressure input, a symmetric shearing force input, and so forth. FIGS. 7A-13C provide an exemplary set of force inputs that may be included within interaction mapping 134.

Once application 130 has mapped the measured force to a particular force input, application 130 may then rely on command mapping 136 to map the force input to a specific command. Command mapping 136 could include, for example, and without limitation, a look-up table (LUT) that maps force inputs to commands. The commands could include, for example, and without limitation, a power on command, an increase volume command, an activate windshield wipers command, an accelerate command, a brake command, a traction control command, a navigation command, and so forth.

By implementing the techniques described thus far, control system 100 allows driver 160 to control any functionality associated with vehicle 150, without removing either hand from steering wheel 150. Accordingly, driver 160 may operate the various subsystems 140 without diverting visual focus from the act of driving, and without sacrificing control of vehicle 150. The basic approach described above is also described, with reference to exemplary implementations, below in conjunction with FIGS. 2A-13C.

Figure 2A:
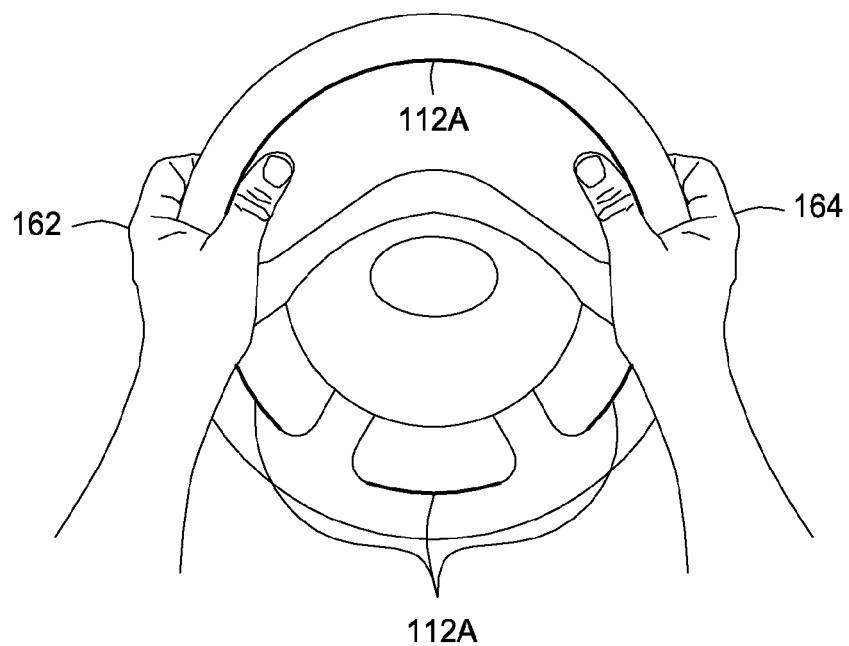
FIGS. 2A-2D illustrate different exemplary configurations of sensors that can be implemented with the steering wheel of FIGS. 1A-1B, according to various embodiments.

FIG. 2A illustrates an exemplary configuration of force sensors that can be implemented with the steering wheel of FIGS. 1A-1B, according to various embodiments. As shown, steering wheel 110 includes sensors 112A positioned within an inner surface of steering wheel 110. Sensors 112A are positioned in the manner shown to optimally detect forces exerted by the thumbs and fingers of the driver. Sensors 112A may be included within sensors 112 shown in FIG. 1A, and therefore may be implemented with any of the sensor types described in conjunction with FIG. 1A. Sensors 112A are configured to output sensor data to computing device 120 for processing by application 130.

Figure 2B:
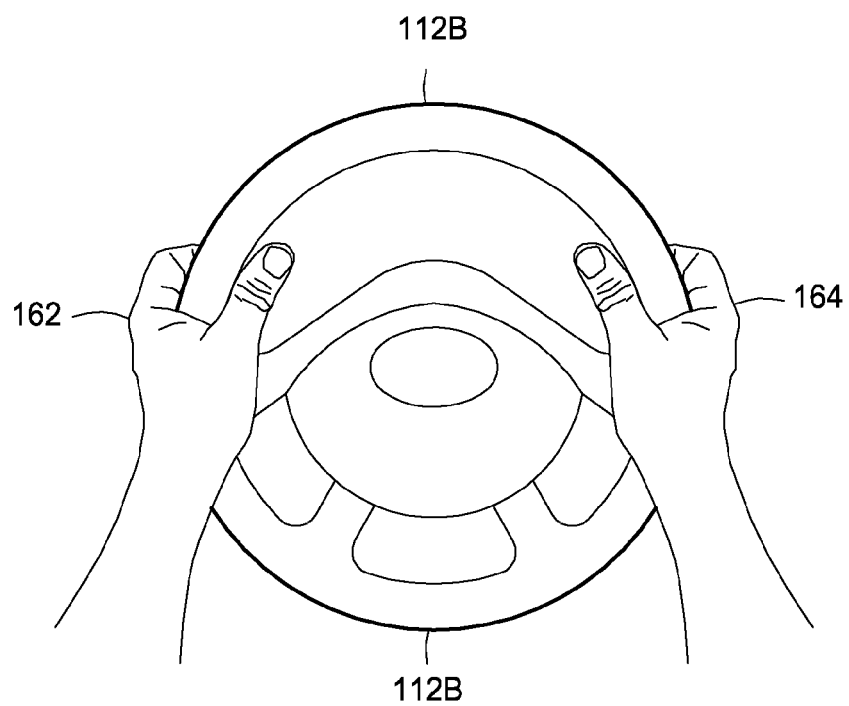

FIG. 2B illustrates another exemplary configuration of force sensors that can be implemented with the steering wheel of FIGS. 1A-1B, according to various embodiments. As shown, steering wheel 110 includes sensors 112B positioned within an outer surface of steering wheel 110. Sensors 112B are positioned in the manner shown to optimally detect forces exerted by the palms of the driver. Sensors 112B may be included within sensors 112 shown in FIG. 1A, and therefore may be implemented with any of the sensor types described in conjunction with FIG. 1A. Sensors 112B are configured to output sensor data to computing device 120 for processing by application 130.

Figure 2C:
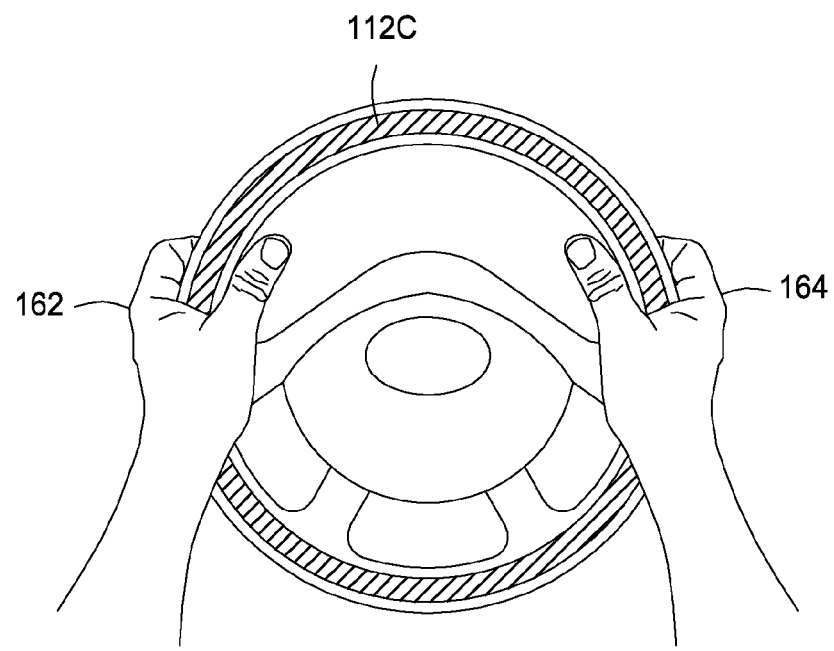

FIG. 2C illustrates another exemplary configuration of force sensors that can be implemented with the steering wheel of FIGS. 1A-1B, according to various embodiments. As shown, steering wheel 110 includes sensors 112C positioned on a front surface of steering wheel 110. Sensors 112C are positioned in the manner shown to optimally detect forces exerted by the thumbs and the palms of the driver. Sensors 112C may be included within sensors 112 shown in FIG. 1A, and therefore may be implemented with any of the sensor types described in conjunction with FIG. 1A. Sensors 112C are configured to output data readings to computing device 120 for processing by application 130.

Figure 2D:
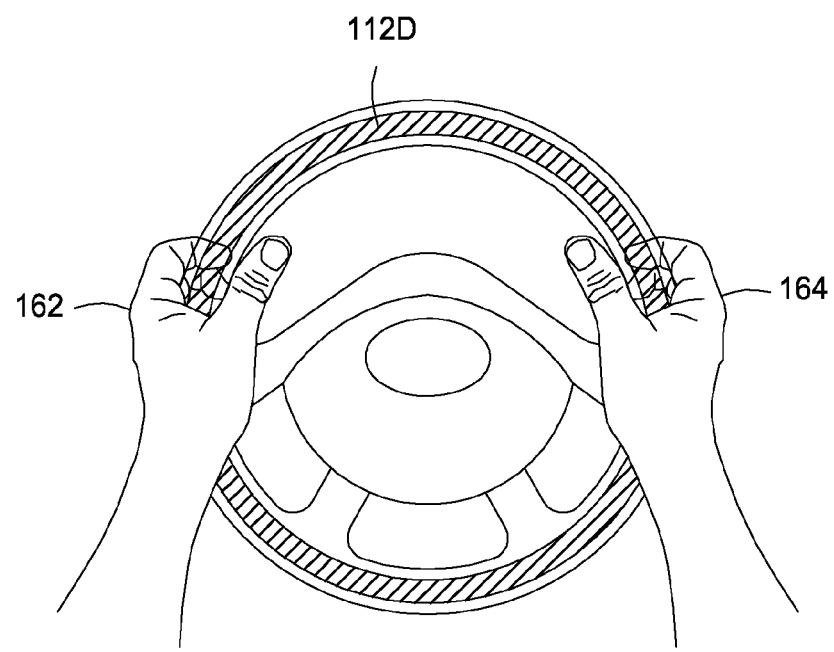

FIG. 2D illustrates another exemplary configuration of force sensors that can be implemented with the steering wheel of FIGS. 1A-1B, according to various embodiments. As shown, steering wheel 110 includes sensors 112D positioned on a rear surface of steering wheel 110. Sensors 112D are positioned in the manner shown to optimally detect forces exerted by the fingers of the driver. Sensors 112D may be included within sensors 112 shown in FIG. 1A, and therefore may be implemented with any of the sensor types described in conjunction with FIG. 1A. Sensors 112D are configured to output sensor data to computing device 120 for processing by application 130.

Referring generally to FIGS. 2A-2D, steering wheel 110 may include some or all of the various types of sensors 112A-112D shown in those figures. Sensors 112A-112D may measure a wide variety of different types of forces applied to steering wheel 110. Those forces could be static or dynamic forces, torque forces, pressure forces, impulse forces, isometric forces, and so forth, without limitation. Steering wheel 110 may be coupled to a steering column that also includes sensors, as described in greater detail below in conjunction with FIG. 3.

FIG. 3 illustrates a steering assembly that can be implemented with the steering wheel of FIGS. 1A-1B, according to various embodiments. As shown, steering assembly 300 includes steering wheel 110 coupled to steering column 310. Steering wheel 110 includes sensors 112A-112D described above in conjunction with FIGS. 2A-2D. As also shown, sensors 312 reside between steering wheel 110 and steering column 310.

Sensors 312 are configured to measure forces applied by steering wheel 110 onto steering column 310. Sensors 312 are also configured to measure the orientation of steering wheel 110. The "orientation" of steering wheel 110 generally refers to any rotation of steering wheel 110 and/or translation of steering wheel 110 relative to steering column 310. In general, forces applied by steering wheel 110 onto steering column 310 may originate from the driver of the vehicle providing force inputs to steering wheel 110. In addition, orientation changes associated with steering wheel 110 may correspond to the driver manipulating steering wheel 110 to navigate the vehicle. Similar to sensors 112A-112D, sensors 312 are also configured to output sensor data to computing device 120 for processing by application 130.

In one embodiment, sensors 312 include a sensor ring coupled to a mounting plate 320 positioned on the back surface of steering wheel 110. The sensor ring may measure orientation changes associated with steering wheel 110 as differential readings between sensors disposed on opposite sides of the ring. For example, if one sensor within the sensor ring registered a pressure force, while an opposing sensor within the ring measured a tension force, then the sensor ring could output a torque measurement associated with steering wheel 110 based on the difference between the pressure and tension forces. Alternatively, the sensor ring could output raw sensor readings to application 130, and application 130 could then process those readings to determine the torque measurement. Persons skilled in the art will recognize that application 130 may implement any technically feasible form of signal processing algorithm to determine forces and/or orientation changes applied to steering wheel 110 based on sensor data received from the sensor ring discussed herein.

Referring generally to FIGS. 1-3, application 130 is configured to receive sensor data from sensors 112 and 312 and to then translate those readings, based on interaction mapping 134, into a specific force input performed by the driver. Then, application 130 maps the specific force input, based on command mapping 136, to a command for one of subsystems 140. For example, suppose the driver applies force to the front surface of steering wheel 110. Sensors 112C would measure the applied force and output sensor data to application 130. Application 130 could then translate the applied force, based on interaction mapping 134, to a "two-handed pressure" force input. Then, based on command mapping 136, application 130 would translate the two-handed pressure interaction to a "honk" command. Finally, application 130 could then output the honk command to the vehicle, thereby causing the horn of vehicle 150 to honk.

Persons skilled in the art will understand that the configurations of sensors described above in conjunction with FIGS. 1-3 are discussed for exemplary purposes only. Any technically feasible approach to identifying force inputs and/or interactions between driver 160 and steering wheel 110 falls within the scope of the various embodiments. For example, and without limitation, application 130 may identify force inputs provided by driver 160 and steering wheel 110 based on optical data associated with driver 160, as described in greater detail below in conjunction with FIG. 4.

FIG. 4 illustrates an exemplary configuration of an optical sensor for detecting force inputs imparted by the driver of a vehicle, according to various embodiments. As shown, vehicle 150 includes optical sensor 412. The hands of driver 160 are positioned on steering wheel 110. Optical sensor 412 is positioned above steering wheel 110 and configured to capture optical data that reflects the positions and configurations of left hand 162 and right hand 164. Optical sensor 412 outputs sensor data to application 130 that reflects these positions and configurations, and application 130 then processes that sensor data to identify specific force inputs performed by driver 160 with steering wheel 110. In doing so, application 130 may rely on interaction mapping 134 of FIG. 1 to translate video data into specific force inputs. Application 130 may implement computer vision techniques, among other possibilities, when identifying those inputs. Upon identifying a force input performed by driver 160, application 130 then maps the specific input, based on command mapping 136, to a command for execution by one of subsystems 140

In some embodiments, the techniques described herein may be implemented in combination with those described above in conjunction with FIGS. 1-3. In particular, application 130 may obtain sensor readings from sensors 112 and 312, as well as sensor readings from optical sensor 412, and then process that data to determine specific interactions that driver 160 performs with steering wheel 110. In some instances, the ability for application 130 to properly map sensor readings to interactions may be improved with optical sensor readings that reflect the hand positions, configurations, and/or motions of the driver. Among other things, the optical data could be processed to disambiguate between force inputs having similar sensor readings provided by sensors 112 and 312.

Figure 5A:
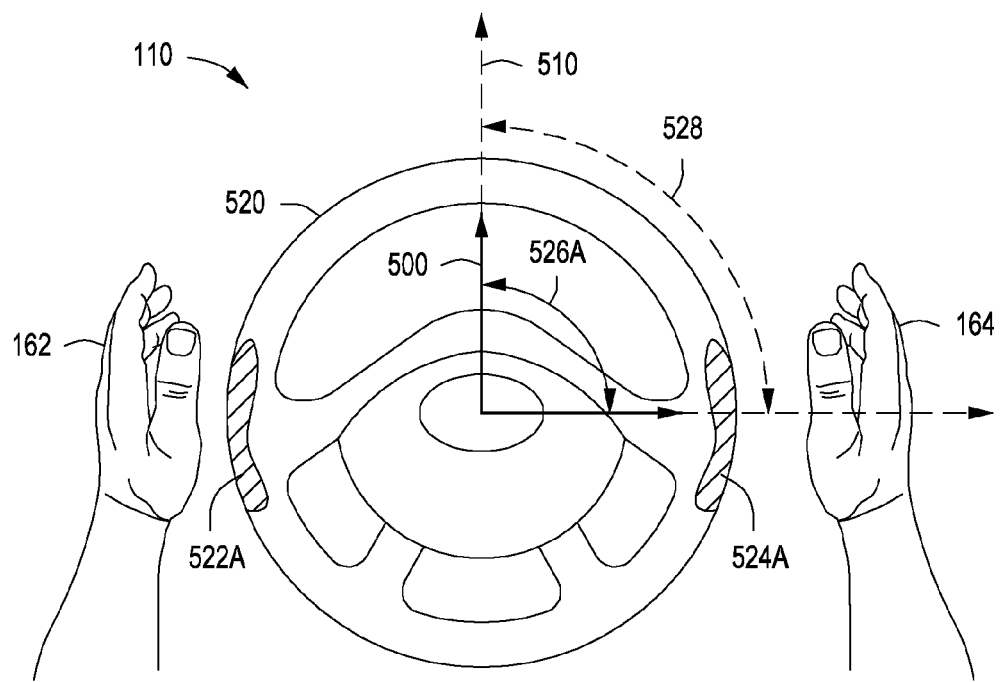
FIGS. 5A-5B illustrate different reference frames associated with the steering wheel of FIGS. 1A-1B, according to various embodiments.
Figure 5B:
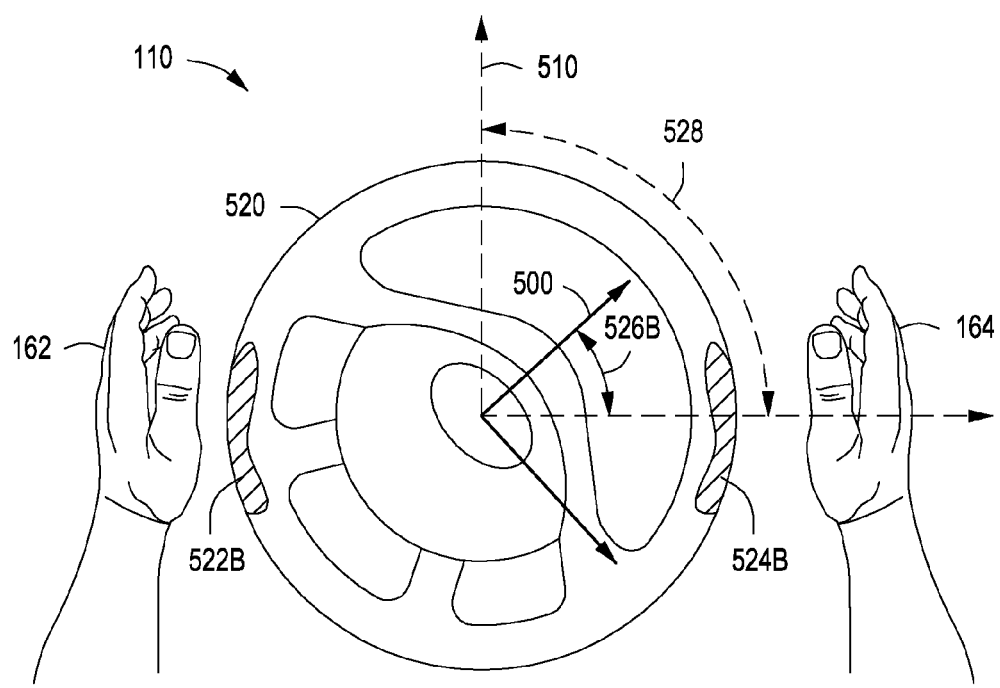

As a general matter, application 130 is configured to process sensor readings received from any of the sensors discussed thus far in any technically feasible fashion, including processing one set of sensor readings based on another set of sensor readings. FIGS. 5A-5B illustrate an exemplary scenario where application 130 processes sensor readings received from sensors 112 based on sensor readings received from sensors 312.

FIG. 5A illustrates different reference frames associated with the steering wheel FIGS. 1A-1B, according to various embodiments. As shown, a physical reference frame 500 and a logical reference frame 510 are superimposed over steering wheel 110. Physical reference frame 500 is stationary with respect to steering wheel 110, and therefore rotates when steering wheel 110 rotates. Logical reference frame 510 is stationary with respect to vehicle 150, and therefore does not rotate when steering wheel 110 rotates. Application 130 may compute the respective orientations of physical reference frame 500 and logical reference frame 510 based, at least in part, on sensor readings received from sensors 312.

Driver 160 may apply forces along perimeter 520 of steering wheel 110 at specific regions 522A and 524A corresponding to left and right hands 162 and 164, respectively, of driver 160. Sensors 112 generally measure these applied forces and corresponding magnitudes, as well as the regions where those forces are applied, along perimeter 520. The position of region 524A along perimeter 520 forms an angle 526A with physical reference frame 500, and also forms an angle 528 with logical reference frame 510. The position of region 522A forms corresponding angles, although these are not shown for simplicity.

Application 130 is configured to implement several different possible techniques to interpret sensor readings received from sensors 112 as specific force inputs performed by driver 150. In one embodiment, application 130 interprets those sensor readings based on the specific regions along perimeter 520 where the sensor readings are captured relative to physical reference frame 500. In another embodiment, application 130 interprets those sensor readings based on the specific regions along perimeter 520 where the sensor readings are captured relative to logical reference frame 510. These two embodiments are described in greater detail in conjunction with FIG. 5B.

In FIG. 5B, steering wheel 110 is rotated, and physical reference frame 500 is rotated in corresponding fashion. Driver 160 applies forces along perimeter 520 at regions 522B and 524B, which reside slightly counterclockwise along perimeter 520 from regions 522A and 524A, respectively. The position of region 524B along perimeter 520 now forms an angle 526B with physical reference frame 500. However, the position of region 524B along perimeter forms angle 528 with logical reference frame 510, similar to the position of region 524A shown in FIG. 5A. The position of region 524A forms corresponding angles, although these are not shown.

According to the first embodiment mentioned above in conjunction with FIG. 5A, application 130 may interpret sensors readings from sensors 112 relative to physical reference frame 500. In this embodiment, application 130 interprets the force inputs shown in FIGS. 5A and 5B differently, because those inputs correspond to different regions along perimeter 520. Specifically, the inputs shown in FIG. 5A involves regions 522A and 524A, while the inputs shown in FIG. 5B involve positions 522B and 524B. Additionally, the position of region 524A in FIG. 5A forms angle 526A with physical reference frame 500, and the position of region 524B in FIG. 5B forms angle 526B with physical reference frame 500.

According to the second embodiment mentioned above in conjunction with FIG. 5A, application may interpret sensors readings from sensors 112 relative to logical reference frame 510. In doing so, application 130 may rely on sensors 312 to determine the relative angle between physical reference frame 500 and logical reference frame 510. In this embodiment, application 130 interprets the force inputs shown in FIGS. 5A and 5B similarly, because those interactions occur at similar locations along perimeter 520 relative to logical reference 520. Specifically, the inputs shown in FIG. 5A occur at regions corresponding to angle 528. Likewise, the inputs shown in FIG. 5B also occurs at regions corresponding to angle 528. Despite those force inputs occurring at different physical regions of steering wheel 110, from the perspective of the driver, these interactions occur at the same logical positions on steering wheel 110.

Application 130 may be configured according to either of the two embodiments described above based on a variety of factors. For example, and without limitation, application 130 could be configured to rely on physical reference frame 500 or, alternatively, logical reference frame 510, depending on factory setting, driver configuration, a specific driver profile associated with driver 160, or the operational state of vehicle 150. Application 130 could, for example, and without limitation, transition between the physical reference frame 500 and the logical reference frame 510 based on the speed of the vehicle or other operational states.

One advantage to implementing the logical reference frame, as discussed in conjunction with the second embodiment, is that driver 160 need not account for the orientation of steering wheel 110 when performing an interaction. Accordingly, driver 160 may perform interactions in an intuitive manner, without first needing to consider specific regions along perimeter 520 of steering wheel 110 where those interactions should be performed. Driver 160 may provide a wide variety of force inputs to steering wheel 110 to control subsystems 140, as described in greater detail below.

Figure 6:
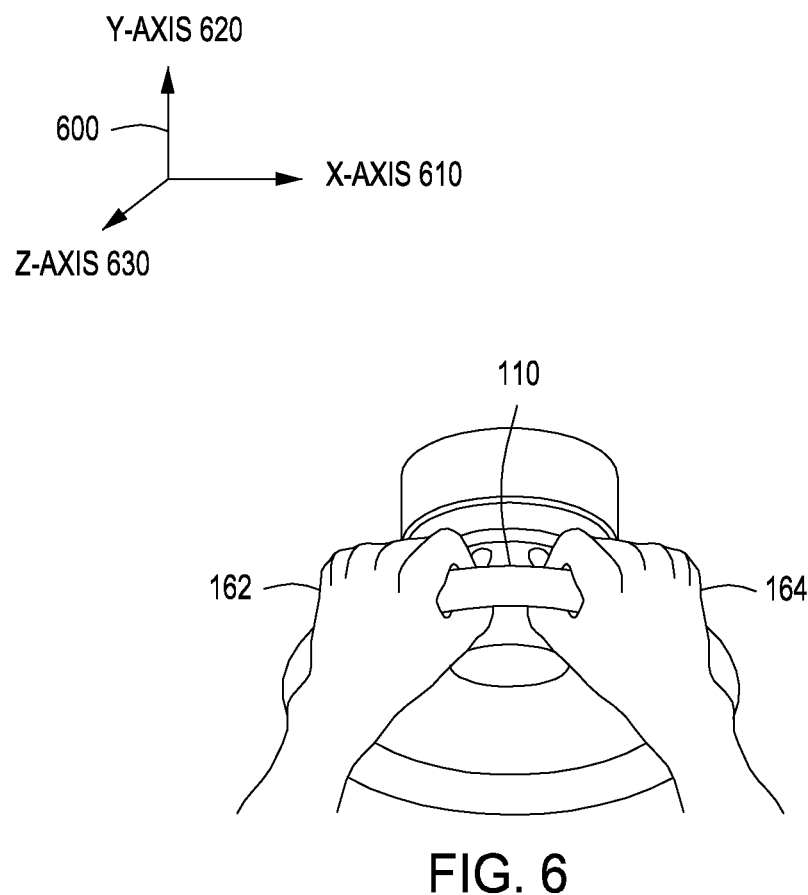
FIG. 6 illustrates the hands of a driver in a resting position on the steering wheel of FIGS. 1A-1B, according to various embodiments.

FIG. 6 illustrates the hands of a driver in a resting position on the steering wheel of FIGS. 1A-1B, according to various embodiments. As shown, axes 600 include X-axis 610, Y-axis 620, and Z-axis 630. Steering wheel 110 rotates around Z-axis 630. Left hand 162 of driver 160 resides in the negative X region of axes 600, while right hand 164 of driver 160 resides in the position X region of axes 600. The coordinate system described in conjunction with FIG. 6 is used in the following FIGS. 7A-13B to describe the various force inputs that driver 160 may perform with steering wheel 110 and that application 130 may, in turn, detect.

Figure 7A:
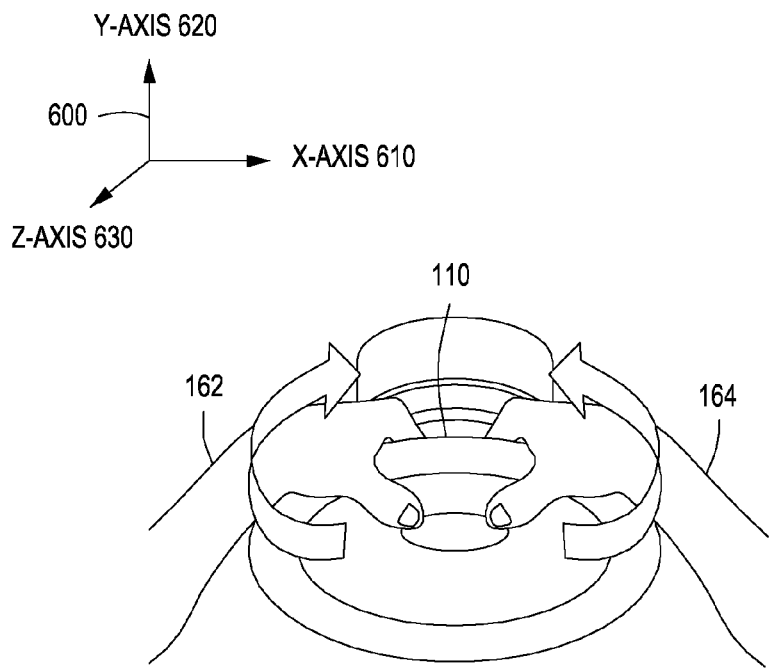
FIGS. 7A-7B illustrate how poloidal forces can be imparted to the steering wheel of FIGS. 1A-1B, according to various embodiments.
Figure 7B:
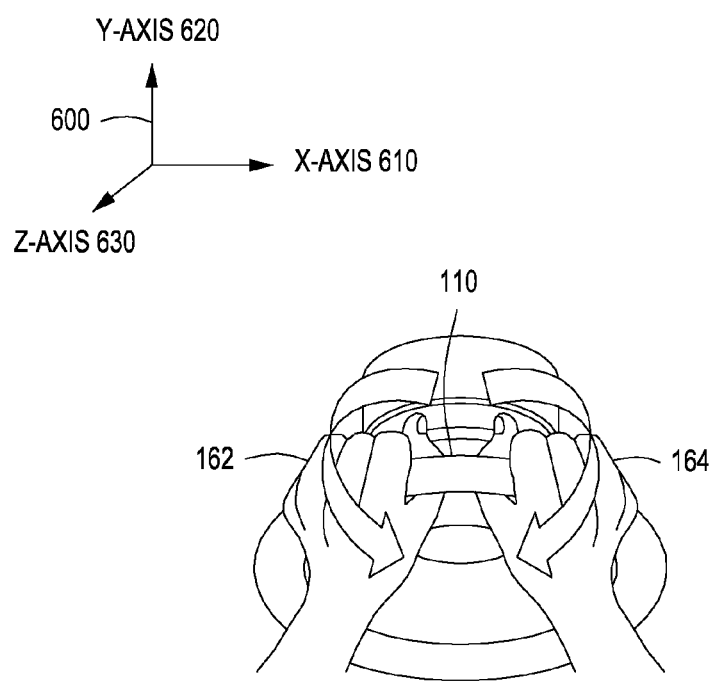

FIGS. 7A-7B illustrate how poloidal shear forces can be imparted to the steering wheel of FIGS. 1A-1B, according to various embodiments. As shown in FIG. 7A, driver 160 imparts a poloidal shear force by gripping steering wheel 110 and then rotating left hand 162 and right hand 164 forward in a substantially negative Z direction across the surface of steering wheel 110. As shown in FIG. 7B, driver 160 imparts another poloidal force by gripping steering wheel 110 and then rotating left hand 162 and right hand 164 backward in a substantially positive Z direction across the surface of steering wheel 110.

Figure 8A:
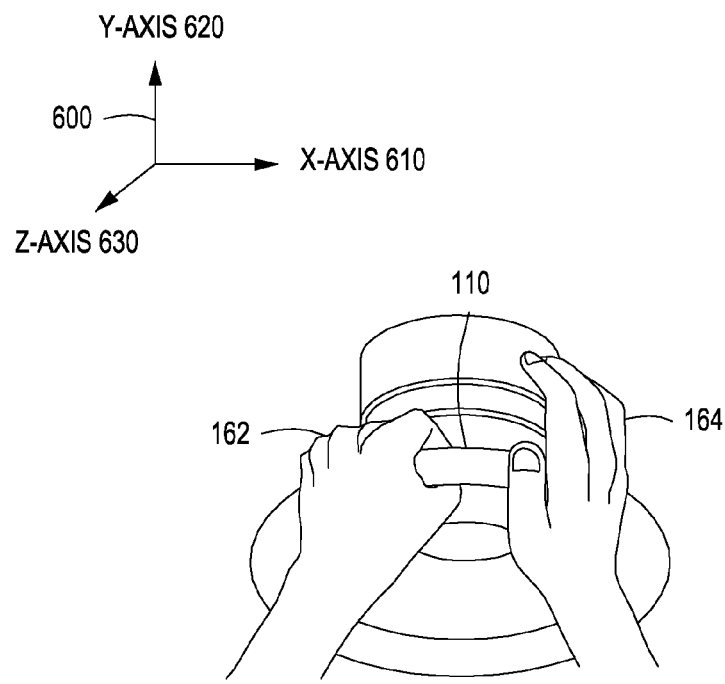
FIGS. 8A-8B illustrate how one-handed pressure forces can be imparted to the steering wheel of FIGS. 1A-1B, according to various embodiments.
Figure 8B:
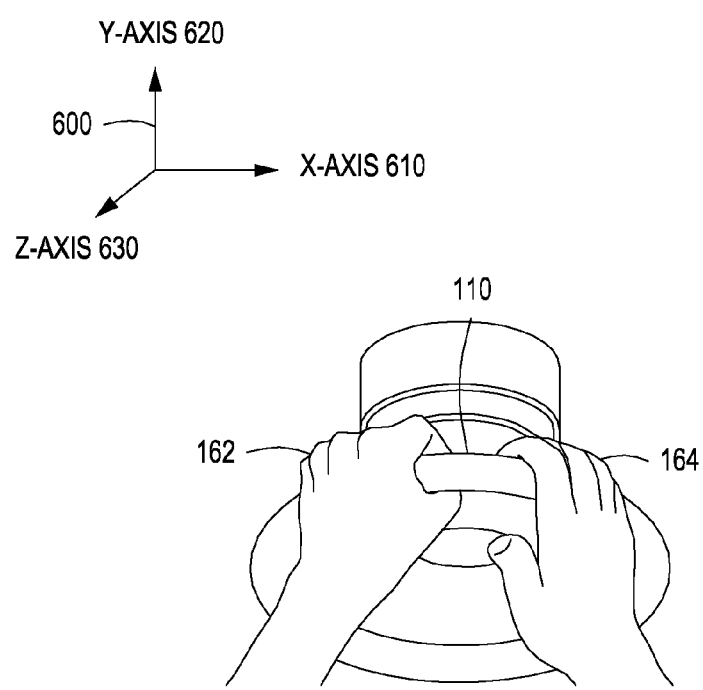

FIGS. 8A-8B illustrate how one-handed pressure forces can be imparted to the steering wheel of FIGS. 1A-1B, according to various embodiments. As shown in FIG. 8A, driver 160 imparts a one-handed pressure force by pressing right hand 164 against steering wheel 110 in a negative Z-direction. As shown in FIG. 8B, driver 160 imparts another one-handed pressure force by pulling steering wheel 110, using right hand 164, in a positive Z direction.

Figure 9A:
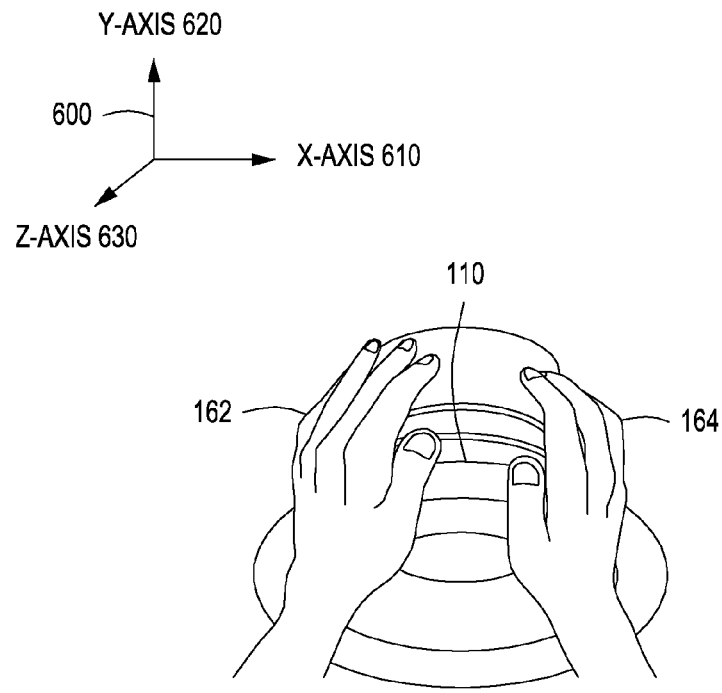
FIGS. 9A-9B illustrate how symmetric two-handed pressure forces can be imparted to the steering wheel of FIGS. 1A-1B, according to various embodiments.
Figure 9B:
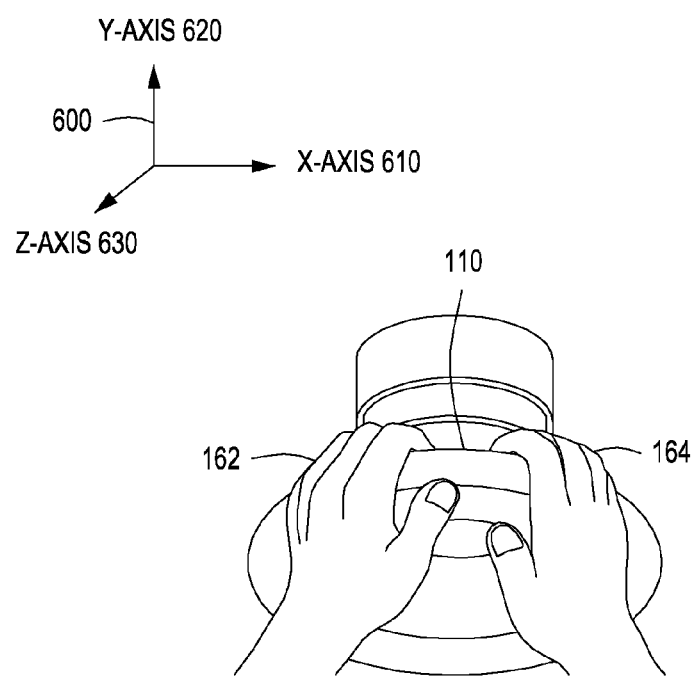

FIGS. 9A-9B illustrate how symmetric two-handed pressure forces can be imparted to the steering wheel of FIGS. 1A-1B, according to various embodiments. As shown in FIG. 9A, driver 160 imparts a two-handed pressure force by pressing left hand 162 and right hand 164 against steering wheel 110 in a negative Z direction. As shown in FIG. 9B, driver 160 imparts another two-handed pressure force by pulling steering wheel 110, using left hand 162 and right hand 164, in a positive Z direction.

Figure 10A:
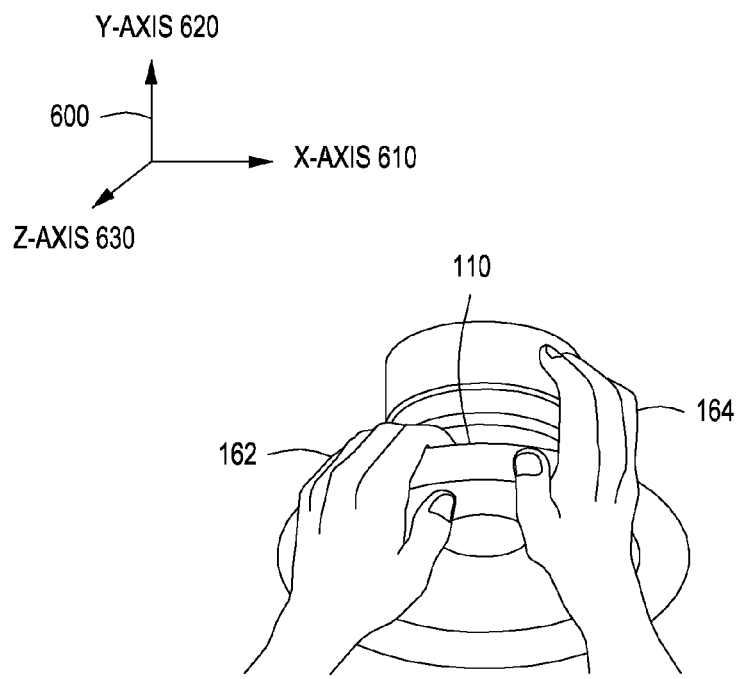
FIGS. 10A-10B illustrate how asymmetric two-handed pressure forces can be imparted to the steering wheel of FIGS. 1A-1B, according to various embodiments.
Figure 10B:
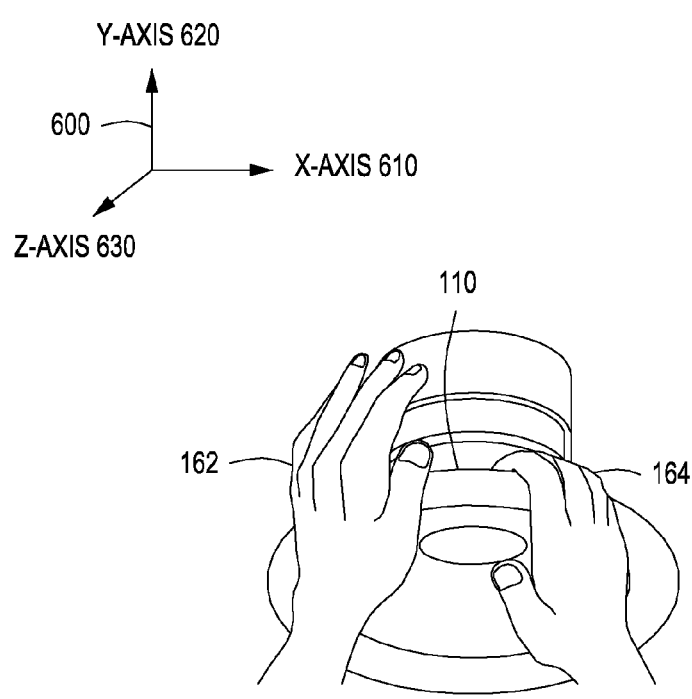

FIGS. 10A-10B illustrate how asymmetric two-handed pressure forces can be imparted to the steering wheel of FIGS. 1A-1B, according to various embodiments. As shown in FIG. 10A, driver 160 imparts a two-handed asymmetric pressure force by pulling steering wheel 110, using left hand 162, in a positive Z-direction, while pressing right hand 164 against steering wheel 110 in a negative Z-direction. As shown in FIG. 10B, driver 160 imparts another two-handed asymmetric pressure force by pressing left hand 162 against steering wheel 110 in a negative Z direction while pulling steering wheel 110, using right hand 164, in a positive Z direction.

Figure 11A:
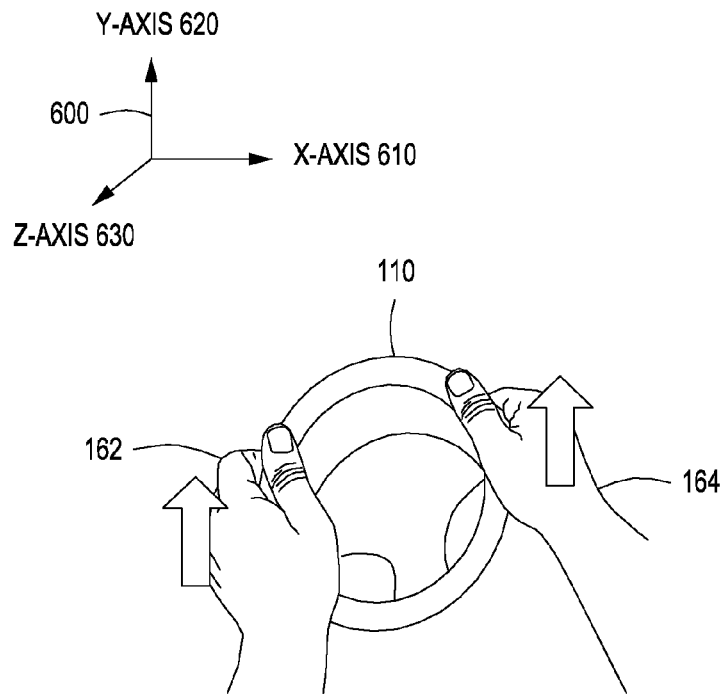
FIGS. 11A-11B illustrate how toroidal shearing forces can be imparted to the steering wheel of FIGS. 1A-1B, according to various embodiments.
Figure 11B:
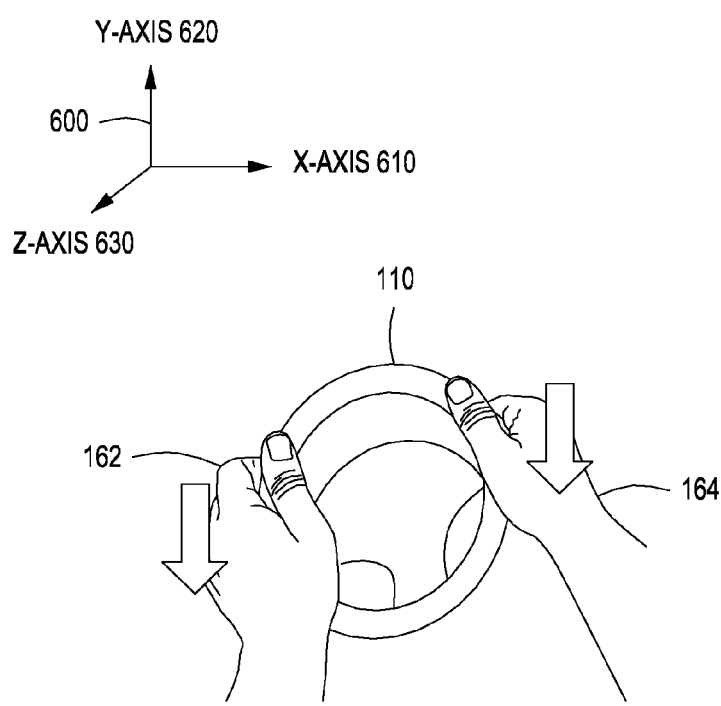

FIGS. 11A-11B illustrate how toroidal shearing forces can be imparted to the steering wheel of FIGS. 1A-1B, according to various embodiments. As shown in FIG. 11A, driver 160 imparts a toroidal shearing force by gripping steering wheel 110 and then exerting a force in a substantially positive Y direction using left hand 162 and right hand 164. As shown in FIG. 11B, driver 160 imparts another toroidal shearing force by gripping steering wheel 110 and then exerting a force in a substantially negative Y direction using left hand 162 and right hand 164.

Figure 12A:
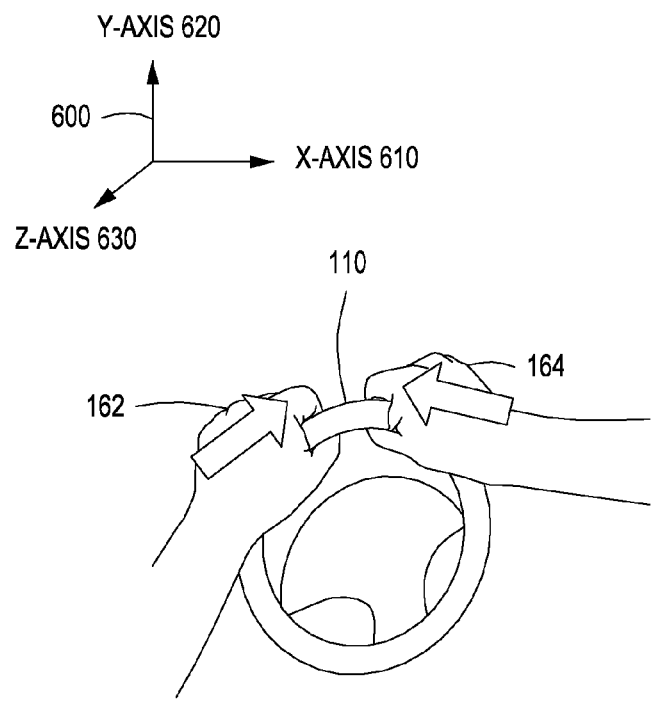
FIGS. 12A-12B illustrate how opposing toroidal shearing forces can be imparted to the steering wheel of FIGS. 1A-1B, according to various embodiments.
Figure 12B:
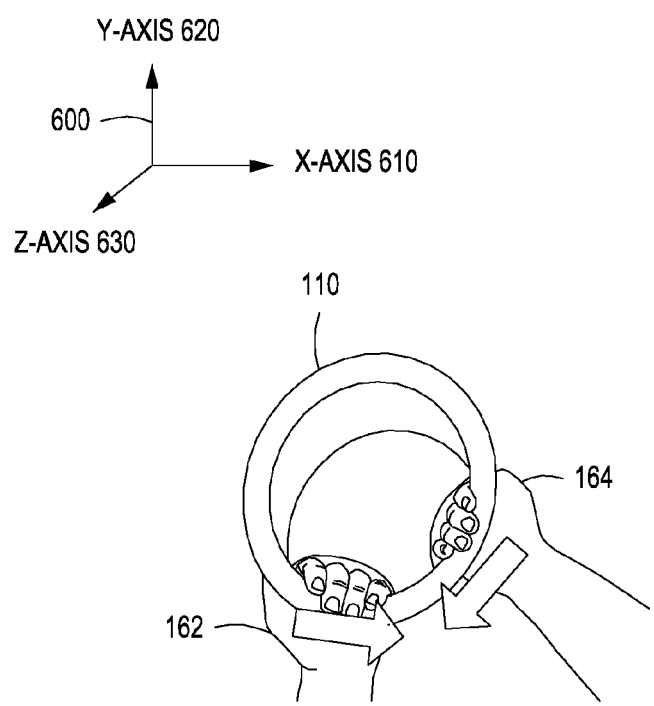

FIGS. 12A-12B illustrate how opposing toroidal shearing forces can be imparted to the steering wheel of FIGS. 1A-1B, according to various embodiments. As shown in FIG. 12A, driver 160 imparts a toroidal shearing force by gripping the top of steering wheel 110 with left hand 162 and exerting force in a substantially positive X direction across the surface of steering wheel 110, while also gripping the top of steering wheel 110 with right hand 164 and exerting force in a substantially negative X direction across the surface of steering wheel 110. As shown in FIG. 12B, driver 160 imparts another opposing toroidal shearing force by gripping the bottom of steering wheel 110 with left hand 162 and exerting force in a substantially positive X direction across the surface of steering wheel 110, while also gripping the bottom of steering wheel 110 with right hand 164 and exerting force in a substantially negative X direction across the surface of steering wheel 110.

Figure 13A:
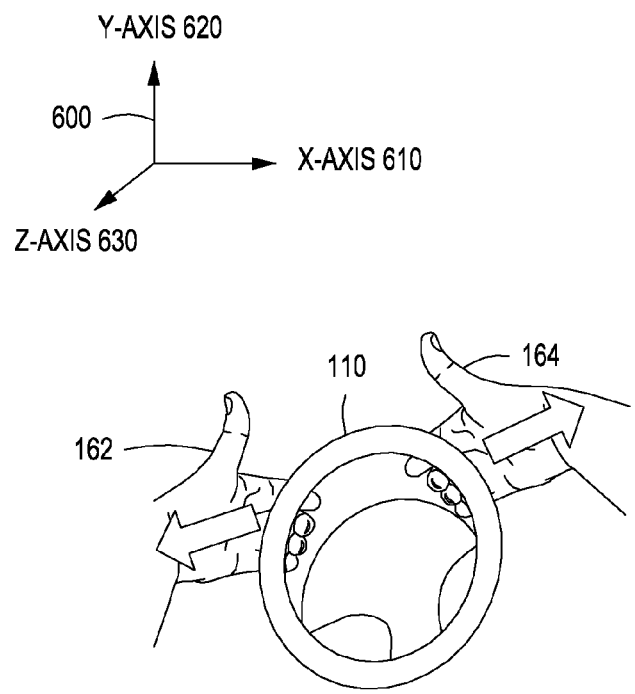
FIGS. 13A-13C illustrate how compression and tension forces can be imparted to the steering wheel of FIGS. 1A-1B, according to various embodiments.
Figure 13B:
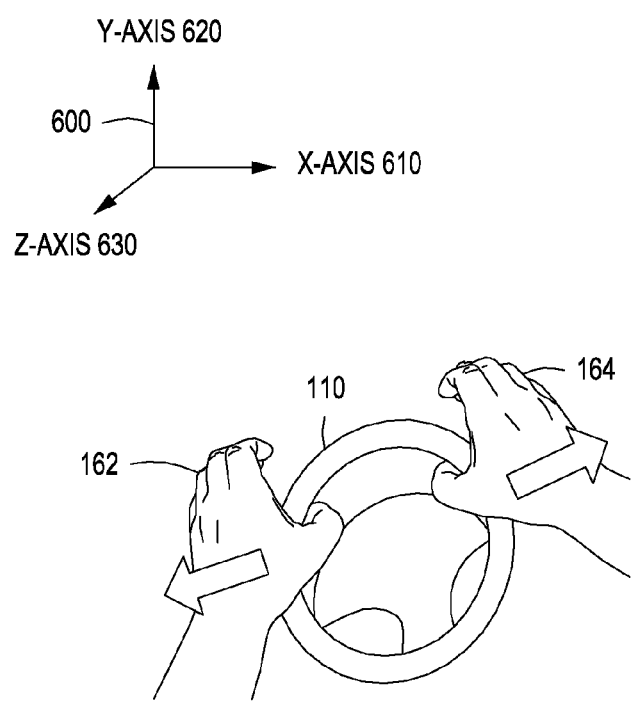
Figure 13C:
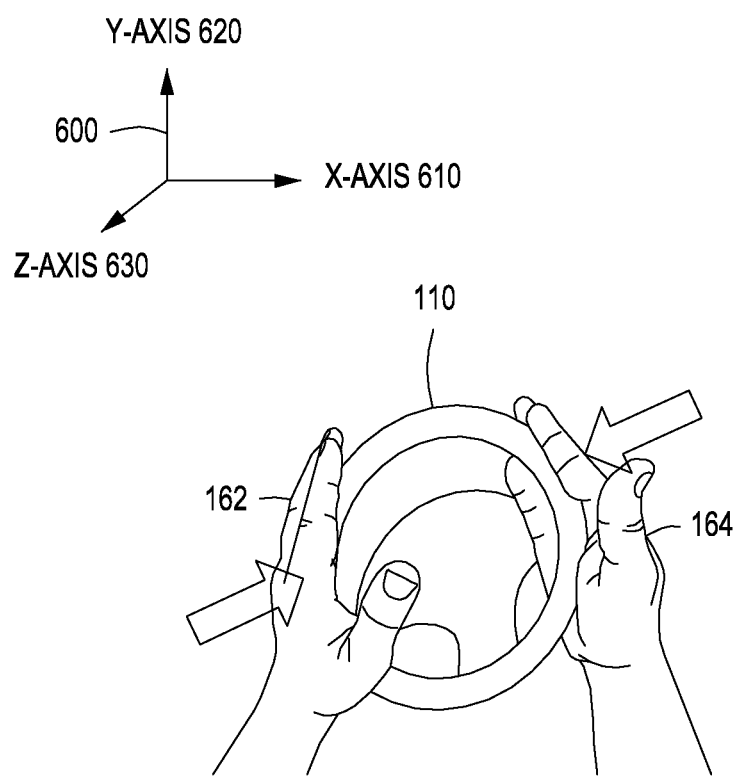

FIGS. 13A-13C illustrate how compression and tension forces can be imparted to the steering wheel of FIGS. 1A-1B, according to various embodiments. As shown in FIG. 13A, user 160 imparts a tension force by pulling steering wheel 110, using the fingers of left hand 162, in the negative X direction, while also pulling steering wheel 110, using the fingers of right hand 164, in the positive X direction. As shown in FIG. 13B, user 160 imparts another tension force by pulling steering wheel 110, using the thumb of left hand 162, in the negative X direction, while also pulling steering wheel 110, using the thumb of right hand 164, in the positive X direction. As shown in FIG. 13C, user 160 imparts a compression force by pressing left hand 162 against steering wheel 110 in the positive X direction, while also pressing right hand 164 against steering wheel 110 in the negative X direction.

Persons skilled in the art will understand that the various techniques for imparting forces described above in conjunction with FIG. 7A-13C are provided for exemplary purposes only, and not meant to limit the scope of the various embodiments. Generally, application 130 is configured to receive and process sensor data that may reflect a wide variety of different types of forces that may be imparted into steering wheel 110. Those different forces may correspond to a vast spectrum of different possible force inputs that application 130 may identify. The various identifiable forces may be imparted using a wide variety of different techniques, which may vary based on ergonomic consideration, among other things. As previously discussed, those inputs may then be mapped to particular commands for execution by subsystems 140.

In addition, although the forces described above in conjunction with FIGS. 7A-13C may appear to be voluntarily initiated by driver 160, application 130 is configured to respond to any force imparted into steering wheel 110. Such forces may include those involuntarily imparted by driver 160, as well as those imparted from a source other than driver 160, among other possibilities. For example, and without limitation, if driver 160 causes vehicle 150 to turn, driver 160 could unconsciously grip steering wheel 110 tightly. Application 130 could measure a torque or shear force associated with that gripping, and then identify a specific force input. Application 130 could then map that force input to a command relevant to the current situation associated with driver 160. In this example, that command could, when executed by a braking subsystem associated with vehicle 150, cause vehicle 150 to slow down. In this fashion, application 130 may identify the state of being associated with driver 160, based on forces that driver 160 imparts to steering wheel 110, and then take action in response. In doing so, application 130 may compare imparted forces to historical trends identified for driver 160 and/or averaged across other drivers. With this approach, application 130 may adapt to the current cognitive, emotional, and/or mental state of driver 160.

Figure 14:
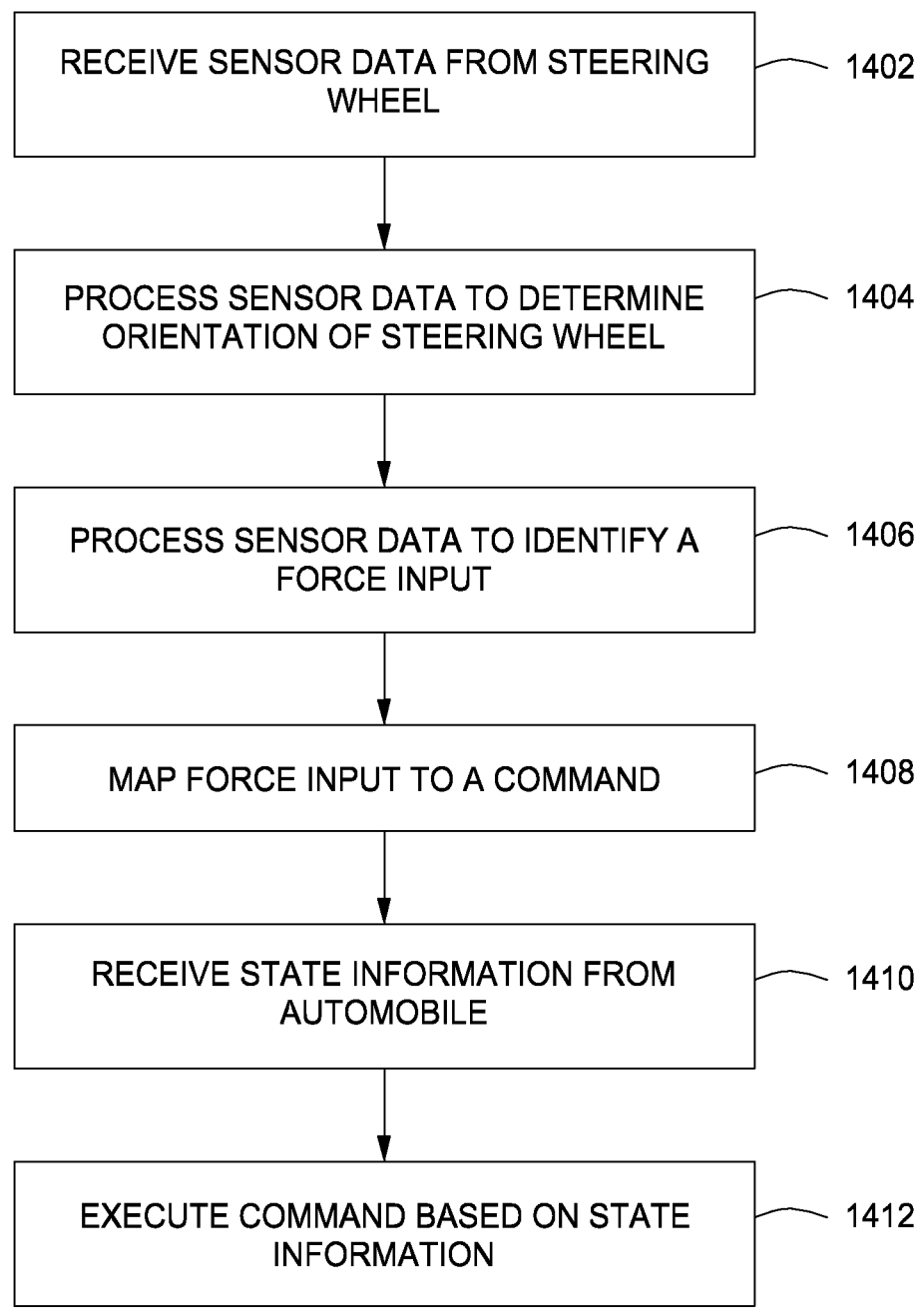
FIG. 14 is a flow diagram of method steps for controlling a subsystem within a vehicle, according to various embodiments.

FIG. 14, described below, sets forth a general sequence of processing steps that may be implemented by application 130 to translate force measurements to commands.

FIG. 14 is a flow diagram of method steps for controlling a subsystem within a vehicle, according to various embodiments. Although the method steps are described in conjunction with the systems of FIGS. 1A-13C, persons skilled in the art will understand that any system configured to perform the method steps, in any order, is within the scope of the various embodiments.

As shown, a method 1400 begins at step 1402, where application 130 within computing device 120 receives sensor data associated with steering wheel 110. The sensor data received at step 1402 may include data captured by any of sensors 112A, 112B, 112C, and 112D shown in FIGS. 2A-2D, respectively, as well as data captured by sensors 312 and/or 412. Accordingly, the sensor data may reflect physical forces imparted by driver 160 into steering wheel 110, the orientation of steering wheel 110, as well as video images showing the hands of driver 160 applying force to steering wheel 110.

At step 1404, application 130 processes the received sensor data to determine the orientation of steering wheel 110. The steering wheel orientation determined at step 1404 may correspond to physical reference frame 500 shown in FIGS. 5A and 5B. The orientation of reference frame 500 is generally derived from sensor data captured by sensors 312 and/or optical sensor 400.

At step 1406, application 130 processes the sensor data received at step 1402 to identify a force input. In doing so, application 130 may process the received sensor data based on interaction mapping 134. Application 130 may identify the force input relative to physical reference frame 500 or logical reference frame 510, in the manner discussed above in conjunction with FIGS. 5A-5B. The identified force input may correspond to any of the exemplary inputs described above in conjunction with FIGS. 7A-13C. The identified force input may also correspond to any technically feasible input to steering wheel 110. In one embodiment, application 130 may emit feedback to driver 160 upon successful identification of a force input. The feedback could be, for example, and without limitation, an audible sound, a visual cue, haptic feedback, and so forth.

At step 1408, application 130 maps the force input identified at step 1406 to a specific command to be executed by one or more of subsystems 140. Application 130 may rely on command map 136 when step 1408 is performed. As discussed, command map 136 provides a mapping from force inputs to commands, allowing application 130 determine a particular command based on a specific force input.

At step 1410, application 130 receives state information from vehicle 150. The state information reflects the overall operating state of vehicle 150. The operating state of vehicle 150 could include, for example, and without limitation, the speed of vehicle 150, the acceleration of vehicle 150, a power level associated with vehicle 150, a set of configuration parameters associated vehicle 150 and/or driver 160, the physical orientation of steering wheel 110, and one or more operating states associated with subsystems 140, and so forth.

At step 1412, application 130 causes the command identified at step 1408 to be executed by one of subsystems 140 based on the state information collected at step 1410. In doing so, application 130 may modify the command based on the operating state of the vehicle, thereby accounting for factors such as acceleration, deceleration, turning, and other dynamics associated with vehicle 150. For example, if vehicle 150 is decelerating, then the force input identified at step 1406 may have magnitude that reflects force exerted by driver 160 and a deceleration force associated with vehicle 150. Application 130 may modify the identified command to correct for such additional forces. In one embodiment, application 130 may also adjust the force input identified at step 1406 based on the state information associated with vehicle 150.

In sum, a steering wheel within a vehicle includes a plurality of sensors that measure forces applied to the steering wheel. An application executing on a computing device records sensor data from the sensors, and then interprets that data as specific force inputs. The application then translates those force inputs into specific commands that can be executed by subsystems within the vehicle.

At least one advantage of the techniques set forth herein is that the driver of a vehicle that implements the force control system need not remove either hand from the steering wheel in order to adjust the operation of subsystems within the vehicle, thereby improving driver safety. In addition, the driver can interact with the force control system without averting visual focus, further improving driver safety. With these techniques, vehicle accidents due to driver distraction may be reduced.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

What is claimed is:

1. A non-transitory computer-readable medium storing program instructions that, when executed by a processor, cause the processor to control the operation of a plurality of subsystems included within a vehicle, by performing the steps of:
    acquiring data from a force sensor that reflects a force imparted into a steering wheel;
    determining, via an image sensor, a position of a hand on the steering wheel;
    processing the data to identify a first force input;
    determining a first command based on the first force input and the position of the hand on the steering wheel; and
    transmitting one or more signals to a first subsystem included in the plurality of subsystems, wherein the first subsystem executes the first command upon receiving the one or more signals.

2. The non-transitory computer-readable medium of claim 1, wherein acquiring the data comprises receiving sensor data from a plurality of force sensors associated with the steering wheel.

3. The non-transitory computer-readable medium of claim 1, wherein the data comprises data related to at least one of a position, a magnitude, and a direction associated with the force.

4. The non-transitory computer-readable medium of claim 3, wherein acquiring data comprises recording a video of hand motions performed by a driver of the vehicle relative to the steering wheel.

5. The non-transitory computer-readable medium of claim 1, wherein the data comprises data related to an orientation of the steering wheel and processing the data is performed based on the orientation of the steering wheel.

6. The non-transitory computer-readable medium of claim 1, wherein converting the first force input into a command is based on a command map that specifies a mapping between force inputs and commands.

7. The non-transitory computer-readable medium of claim 1, further comprising a step of determining an operational state associated with the vehicle and processing the sensor data to identify the force input based on the operational state of the vehicle.

8. The non-transitory computer-readable medium of claim 1, wherein the force comprises at least one of a linear force, an impulse force, a pressure force, a shear force, a torque force, a toroidal force, and a poloidal force.

9. A system for controlling the operation of a plurality of subsystems within a vehicle, comprising:
    a steering wheel coupled to a steering column;
    a first plurality of sensors between the steering wheel and the steering column and configured to acquire first sensor data that reflects a force imparted into the steering wheel; and
    a computing device coupled to the steering wheel and including:
        a memory storing a software application, and
        a processor that, upon executing the software application, is configured to:
            process the first sensor data to identify a first force input included in a plurality of force inputs;
            convert the first force input into a first command; and
            transmit one or more signals to a first subsystem included in the plurality of subsystems, wherein the first subsystem executes the first command upon receiving the one or more signals.

10. The system of claim 9, wherein the steering wheel comprises a structure configured to deform in response to the force, and wherein the first sensor data represents the deformation of the steering wheel in response to the force.

11. The system of claim 9, wherein the first plurality of sensors includes:
    a first set of sensors disposed on an inner perimeter associated with the steering wheel;
    a second set of sensors disposed on an outer perimeter associated with the steering wheel;
    a third set of sensors disposed on a front surface of the steering wheel; and
    a fourth set of sensors disposed on a rear surface of the steering wheel.

12. The system of claim 9, wherein the steering wheel further includes a second plurality of sensors mounted between the steering wheel and a steering column, and wherein the second plurality of sensors is configured to acquire second sensor data that reflects an orientation of the steering wheel relative to the steering column.

13. The system of claim 12, wherein the processor, upon executing the software application, is further configured to:
    compute a physical reference frame that is stationary with respect to the steering wheel;
    compute a logical reference frame that is stationary with respect to the vehicle; and
    compute an angle between the physical reference frame and the logical reference frame, wherein the first sensor data is processed, based on the angle, to identify the first force input.

14. The system of claim 13, wherein a sensor in the first plurality of sensors or the second plurality of sensors comprises at least one of a pressure sensor, a pneumatic sensor, a strain gauge, a load cell, a piezoelectric crystal, a resistive sensor, a capacitive sensor, a visual sensor, a thermal sensor, an ultrasonic sensor, an infrared sensor, a laser-based sensor, a radar-based sensor, a time-of-flight sensor and a structured light-based sensor.

15. The system of claim 9, further comprising an output device, wherein the processor, upon executing the software application and identifying the first force input, is configured to cause the output device to generate first feedback indicating that the first force input was identified.

16. The system of claim 15, wherein the first feedback comprises at least one of audio feedback, visual feedback, and haptic feedback directed towards a driver of the vehicle.

17. A computer-implemented method for controlling the operation of a plurality of subsystems within a vehicle, the method comprising:
- detecting a first toroidal force imparted to a steering wheel by a first hand while detecting a second toroidal force imparted to the steering wheel by a second hand, wherein a first direction of the first toroidal force and a direction of the second toroidal force are opposing;
- selecting a first command based on the first toroidal force and the second toroidal force; and
- transmitting one or more signals to a first subsystem included in the plurality of subsystems, wherein the first subsystem executes the first command upon receiving the one or more signals.

18. The computer-implemented method of claim 17, wherein the first toroidal force and the second toroidal force cause the orientation of the steering wheel to remain in a fixed position.

* * * * *